United States Patent
Antor et al.

(10) Patent No.: US 10,839,345 B2
(45) Date of Patent: Nov. 17, 2020

(54) SYSTEMS AND METHODS FOR EXECUTING SMART CONTRACTS USING A BLOCK CHAIN

(71) Applicant: BXB Digital Pty Limited, Sydney (AU)

(72) Inventors: Cornelius Antor, Munich (DE); Thomas Heinzel, Alameda, CA (US); Sara Barnhart Fletcher, Atlanta, GA (US)

(73) Assignee: BXB DIGITAL PTY LIMITED, Sydney (AU)

( * ) Notice: Subject to any disclaimer, the term of this patent is extended or adjusted under 35 U.S.C. 154(b) by 81 days.

(21) Appl. No.: 16/117,801

(22) Filed: Aug. 30, 2018

(65) Prior Publication Data

US 2019/0130345 A1 May 2, 2019

Related U.S. Application Data

(60) Provisional application No. 62/578,130, filed on Oct. 27, 2017.

(51) Int. Cl.
| | |
|---|---|
| *G06Q 10/08* | (2012.01) |
| *G06F 16/182* | (2019.01) |
| *G06F 21/64* | (2013.01) |
| *G06Q 10/06* | (2012.01) |
| *G06Q 20/40* | (2012.01) |
| *H04L 9/06* | (2006.01) |

(52) U.S. Cl.
CPC ......... *G06Q 10/087* (2013.01); *G06F 16/182* (2019.01); *G06F 21/64* (2013.01); *G06Q 10/063* (2013.01); *G06Q 10/0833* (2013.01); *G06Q 20/401* (2013.01); *H04L 9/0637* (2013.01)

(58) Field of Classification Search
CPC .................................. G06Q 10/08; H04L 9/32
USPC .......................................................... 705/28
See application file for complete search history.

(56) References Cited

U.S. PATENT DOCUMENTS

| | | | |
|---|---|---|---|
| 5,774,876 | A  | 6/1998  | Woolley et al. |
| 6,199,488 | B1 | 3/2001  | Favaron et al. |
| 6,294,114 | B1 | 9/2001  | Muirhead |
| 6,483,434 | B1 | 11/2002 | Umiker |
| 6,661,339 | B2 | 12/2003 | Muirhead |

(Continued)

FOREIGN PATENT DOCUMENTS

WO       2017165909       10/2017

OTHER PUBLICATIONS

International Application No. PCT/US2018/048832, "International Search Report and Written Opinion" dated Oct. 30, 2018, 11 pages.

(Continued)

*Primary Examiner* — Oluseye Iwarere
(74) *Attorney, Agent, or Firm* — Kilpatrick Townsend & Stockton LLP

(57) ABSTRACT

According to some embodiments of the invention, smart contracts may be recorded to a block chain. Data may be collected from pallets tagged with beacons and may be saved to the block chain. This data may be indicative of the partial or complete fulfillment of one or more conditions of smart contracts recorded to the block chain. Upon fulfillment of particular conditions as indicated by the block chain, the smart contracts may be automatically executed (e.g., payment may be initiated).

20 Claims, 8 Drawing Sheets

(56) References Cited

U.S. PATENT DOCUMENTS

| | | | |
|---|---|---|---|
| 6,669,089 | B2 | 12/2003 | Cybulski et al. |
| 6,718,888 | B2 | 4/2004 | Muirhead et al. |
| 6,749,418 | B2 | 6/2004 | Muirhead |
| 6,814,287 | B1 | 11/2004 | Chang et al. |
| 6,943,678 | B2 | 9/2005 | Muirhead |
| 7,342,496 | B2 | 3/2008 | Muirhead |
| 7,735,430 | B2 | 6/2010 | Muirhead |
| 7,752,980 | B2 | 7/2010 | Muirhead |
| 7,789,024 | B2 | 9/2010 | Muirhead |
| 7,804,400 | B2 | 9/2010 | Muirhead |
| 7,874,256 | B2 | 1/2011 | Muirhead |
| 7,948,371 | B2 | 5/2011 | Muirhead |
| 7,963,235 | B2 | 6/2011 | Muirhead |
| 8,077,040 | B2 | 12/2011 | Muirhead |
| 8,210,107 | B2 | 7/2012 | Muirhead |
| 8,313,594 | B2 | 11/2012 | Muirhead |
| 8,331,862 | B2 | 12/2012 | Twitchell, Jr. |
| 8,347,794 | B2 | 1/2013 | Muirhead |
| 8,511,555 | B2 * | 8/2013 | Babcock ............... G06Q 10/06 235/385 |
| 8,585,850 | B2 | 11/2013 | Muirhead |
| 9,230,227 | B2 | 1/2016 | Muirhead |
| 9,613,239 | B2 | 4/2017 | Lee et al. |
| 9,679,237 | B2 | 6/2017 | Linkesch et al. |
| 9,813,850 | B2 | 11/2017 | Lee et al. |
| 9,947,196 | B2 | 4/2018 | Lee et al. |
| 10,339,619 | B2 | 7/2019 | Muirhead |
| 10,368,222 | B2 * | 7/2019 | Carlson ............... G06Q 10/0833 |
| 10,491,375 | B2 * | 11/2019 | Maggu ................... G06Q 40/02 |
| 2006/0232412 | A1 | 10/2006 | Tabacman et al. |
| 2011/0169636 | A1 | 7/2011 | Kadaba |
| 2011/0266338 | A1 * | 11/2011 | Babcock ............... G06Q 10/06 235/375 |
| 2012/0252501 | A1 | 10/2012 | Smith et al. |
| 2014/0049392 | A1 | 2/2014 | Wagner |
| 2015/0379510 | A1 * | 12/2015 | Smith ................... H04L 9/3242 705/71 |
| 2016/0063550 | A1 * | 3/2016 | Caldwell ............ G06Q 30/0255 705/14.53 |
| 2017/0140408 | A1 | 5/2017 | Wuehler |
| 2017/0323412 | A1 | 11/2017 | Muirhead |
| 2017/0366357 | A1 | 12/2017 | Pattanaik et al. |
| 2018/0082390 | A1 | 3/2018 | Leidner et al. |
| 2018/0089638 | A1 | 3/2018 | Christidis et al. |
| 2018/0143995 | A1 * | 5/2018 | Bailey ................. G06F 21/6218 |
| 2018/0232693 | A1 * | 8/2018 | Gillen ................. G06Q 10/0834 |
| 2019/0012637 | A1 * | 1/2019 | Gillen ................... H04L 9/0819 |
| 2019/0019144 | A1 * | 1/2019 | Gillen ................... H04L 9/3247 |
| 2019/0080392 | A1 * | 3/2019 | Youb ...................... G06Q 40/00 |
| 2019/0098432 | A1 * | 3/2019 | Carlson ................. G06F 1/3287 |
| 2019/0109702 | A1 * | 4/2019 | Maggu .................. G06Q 20/06 |
| 2019/0130345 | A1 * | 5/2019 | Antor ................. G06Q 10/0833 |
| 2019/0190719 | A1 * | 6/2019 | van de Ruit ............ G06F 21/64 |
| 2019/0259062 | A1 * | 8/2019 | Caldwell ............ G06Q 30/0255 |
| 2019/0340623 | A1 * | 11/2019 | Rivkind .............. G06F 16/2365 |
| 2019/0370816 | A1 * | 12/2019 | Hu ........................ H04L 9/3239 |
| 2020/0019927 | A1 | 1/2020 | Muirhead |
| 2020/0118117 | A1 * | 4/2020 | McManus ............ G06Q 10/087 |

OTHER PUBLICATIONS

Weber et al., "Untrusted Business Process Monitoring and Execution Using Blockchain", Medical Image Computing and Computer-Assisted Intervention—Miccai 2015: 18th International Conference, Munich, Germany, Sep. 8, 2016, pp. 329-347.

International Application No. PCT/US2018/048832, "International Preliminary Report on Patentability", dated May 7, 2020, 7 pages.

GoTo Pallets inc. "The future of the pallet pooling industry begins with the G2 Pallet." Retrieved capture from http://gotopallets.com for the date of Oct. 1, 2016, 77 pages.

Roussel, J., "Making the Supply Chain Everyone's Business," May 9, 2014, 8 pages.

"Recommendations on the Grocery Industry Pallet System," written for the the Grocery Industry Pallet Subcommittee by Cleveland Consulting Associates, Jan. 1, 1992, 16 pages.

GoTo Pallets Marketing Brochure dated Oct. 12, 2016. Retrieved from 8 http://gotopallets.com 8 pages.

* cited by examiner

SYSTEMS AND METHODS FOR EXECUTING SMART CONTRACTS USING A BLOCK CHAIN

CROSS-REFERENCES TO RELATED APPLICATIONS

This application claims the benefit of U.S. Provisional Patent Application No. 62/578,130, filed Oct. 27, 2017, the contents of which are herein incorporated by reference in their entirety.

FIELD

The present disclosure generally relates to smart contracts, and more specifically to systems and methods for executing smart contracts in a supply and distribution chain using a block chain.

BACKGROUND

Monitoring pallet movement and environmental conditions through a supply and distribution chain can aid in diagnosing issues with loss and recovery, damage and cycle time. Reducing loss, damage and cycle time may have a material economic benefit for entities across the supply chain. Tracking pallets through the supply chain may also facilitate tracking of the assets they carry whenever an association between the two may be captured.

BRIEF SUMMARY

In some systems, contract fulfillment in the supply chain is tracked manually. A grower of produce may have a contract to sell the produce to a grocery store. The grocery store may consider the contract to be fulfilled when the produce is delivered to the grocery store in reasonable condition. The grocery store may then communicate to the grower that the contract has been fulfilled and receive payment. In another example, a shipper may have a contract with a carrier to deliver pallets of goods across the country. The contract may be fulfilled when the pallets are delivered to the destination according to the conditions laid out by the contract (e.g., at the promised time, at a particular temperature, etc.). The carrier may then notify the shipper and other interested parties that the contract has been fulfilled. The shipper can then initiate a payment to the carrier.

Such manual tracking of contract fulfillment may result in inefficiencies and inaccuracies. Thus, provided are methods, including computer-implemented methods, devices, and computer-program products applying systems and methods for executing smart contracts in a supply and distribution chain using a block chain. According to some embodiments of the invention, smart contracts may be recorded to a block chain. Data may be collected from pallets tagged with readers and may be saved to the block chain. This data may be indicative of the partial or complete fulfillment of one or more conditions of smart contracts recorded to the block chain. Upon fulfillment of particular conditions as indicated by the block chain, the smart contracts may be automatically executed (e.g., payment may be initiated).

According to some embodiments of the invention, a computer-implemented method is provided. The method comprises aggregating a plurality of conditions received automatically from a plurality of sources across a supply chain. The plurality of conditions relate to goods in the supply chain. The method further comprises recording a smart contract to a ledger. The ledger may be distributed or multi-access. The smart contract is a self-executing contract for a first source of the plurality of sources to execute a first condition of the plurality of conditions and a second source of the plurality of sources to execute a second condition of the plurality of conditions. The method further comprises receiving, at a communication unit affixed to a carrier of the goods, data associated with the goods in the supply chain. The method further comprises recording the data associated with the goods to the ledger. The data fulfills the first condition of the first source. The method further comprises automatically executing the second condition of the second source.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
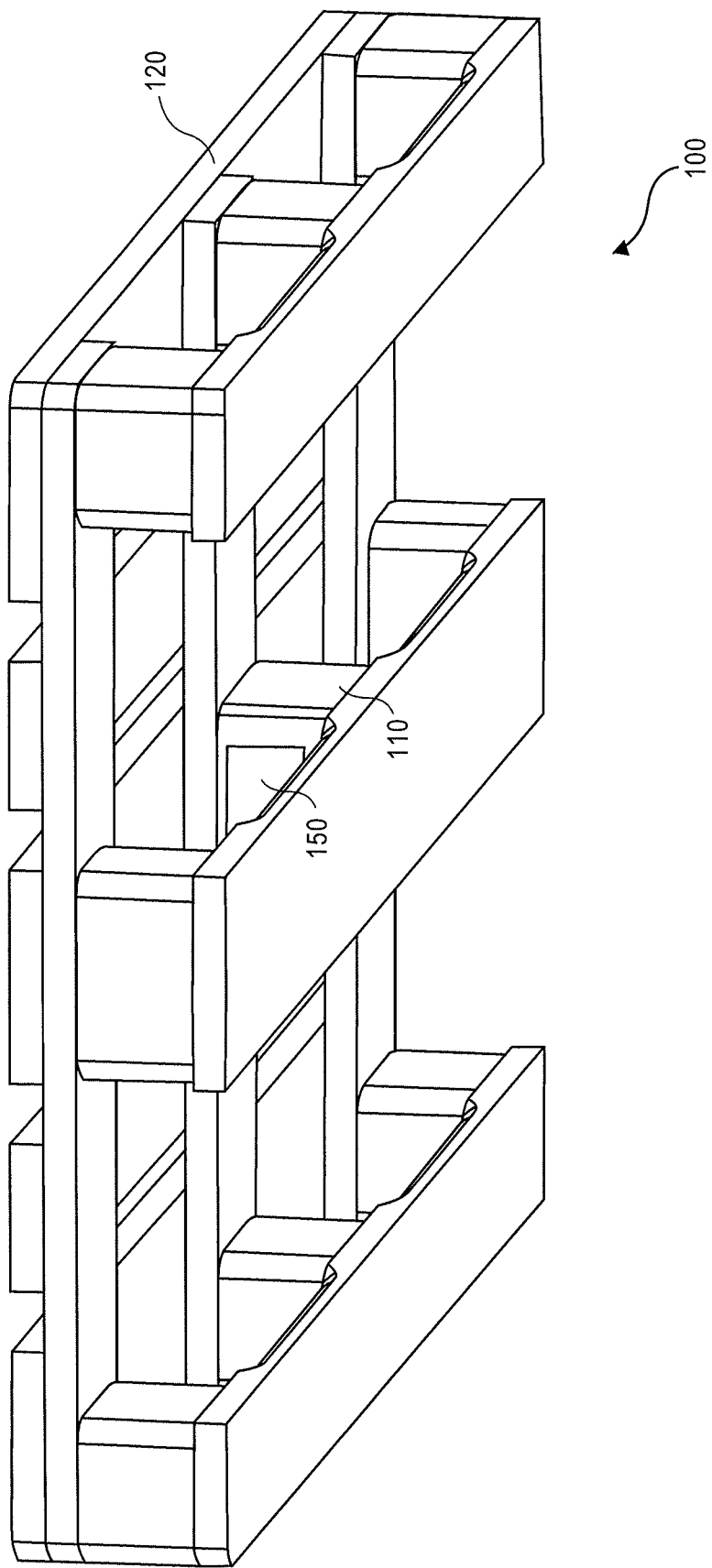
FIG. 1 is a bottom perspective view of a pallet with a beacon, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

A pallet may be a structure that supports physical assets for storage, presentation, handling, and/or transportation. As used herein, the term "pallet" may be used to describe any load carrier, goods carrier, or product conveyance platform, including any type of reusable plastic container (RPC), platform, dolly, bin, keg, box (including corrugated box), container, enclosure, shipping container, and the like. The physical assets may be any physical assets, such as perishable or nonperishable physical goods. FIG. 1 is a bottom perspective view of a pallet 100, in accordance with some embodiments. The pallet 100 may include a base 120 and legs 110. The pallet 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the pallet 100. Although shown as having a particular design in FIG. 1, it is contemplated that any design may be incorporated on or in the base 120. For example, the base 120 may have smaller, larger, fewer, more, differently shaped, or differently placed spacings than those shown in FIG. 1, depending on characteristics of the particular physical asset to be placed on the base 120 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having three legs 110, it is contemplated that the pallet 100 may have any suitable number of legs or no legs. For example, in some embodiments, the pallet 100 may include a base 120 on both the top and bottom of the pallet 100 with no legs. In another example, for heavier physical assets, the pallet 100 may include one or more additional legs centrally located with respect to the pallet 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. Further, the pallet 100 may be a half pallet or a quarter pallet. In some embodiments, the pallet 100 may be constructed to include unique physical features. In some embodiments, the base 120 may be made of a same or different material than the legs 110. In some embodiments, the base 120 and the legs 110 may form a single unitary body (e.g., formed from a single mold). In some embodiments, the base 120 may be removable from one or more of the legs 110.

Figure 2:
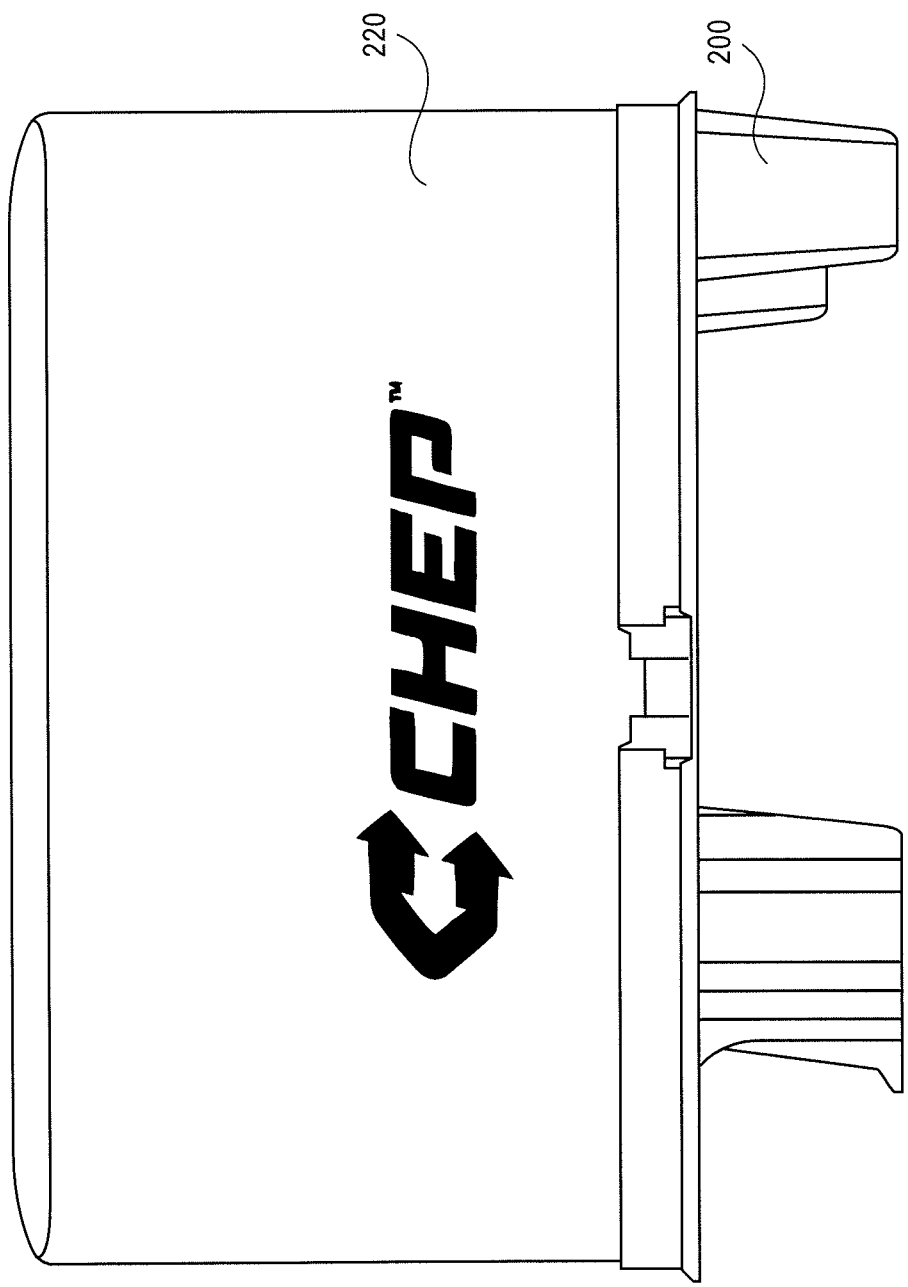
FIG. 2 is a side view of a pallet with a load, in accordance with some embodiments.

In some embodiments, additional components may be integrated with the pallet 100. For example, the underside of the pallet 100 may include a beacon 150. The beacon 150 may be one example of a communication unit that may be used. The beacon 150 may include any electronic device capable of handling or storing data. The beacon 150 may include a number of different functionalities. For example, the beacon 150 may be programmed with the type of physical asset located on the pallet 100 and/or an identifier of the pallet 100. The beacon 150 may further include or be in operable communication with one or more sensors configured to monitor certain conditions of the pallet 100 (e.g., environmental conditions, movements, etc.). The beacon 150 may be capable of communication with other devices, such as other beacons, devices, and/or servers. The beacon 150 is described further herein with respect to FIG. 4. Although shown as being located in a particular position on the pallet 100, it is contemplated that the beacon 150 may be located in any suitable position on the pallet 100. FIG. 2 is a side view of another exemplary pallet 200 with a load 220 placed atop the pallet 200 for transportation, storage, presentation, etc. As used herein, pallet 100 may be referred to interchangeably with pallet 200.

Systems for Pallet Tracking

In some cases, it may be desirable to track a pallet. As used herein, "pallet tracking" may refer to the collecting and tracking of any data related to a pallet, such as a pallet's location in the supply chain and/or environmental or other conditions of the pallet. According to some embodiments of the invention, data may be collected by a plurality of tagged pallets. As used herein, the term "tagged pallet" may refer to a pallet including a beacon and one or more sensors. In some embodiments, a tagged pallet may include an RFID tag. The data collected by the tagged pallets may be transmitted using any communication protocol, including short range, long range, and/or a low power communication protocol. Once the tracking data has been collected, this information may be used to compute supply chain visibility metrics, such as inventory at any given location or region, dwell time, and velocity metrics between regions of the supply chain or between any set of nodes within the supply chain.

Figure 3:
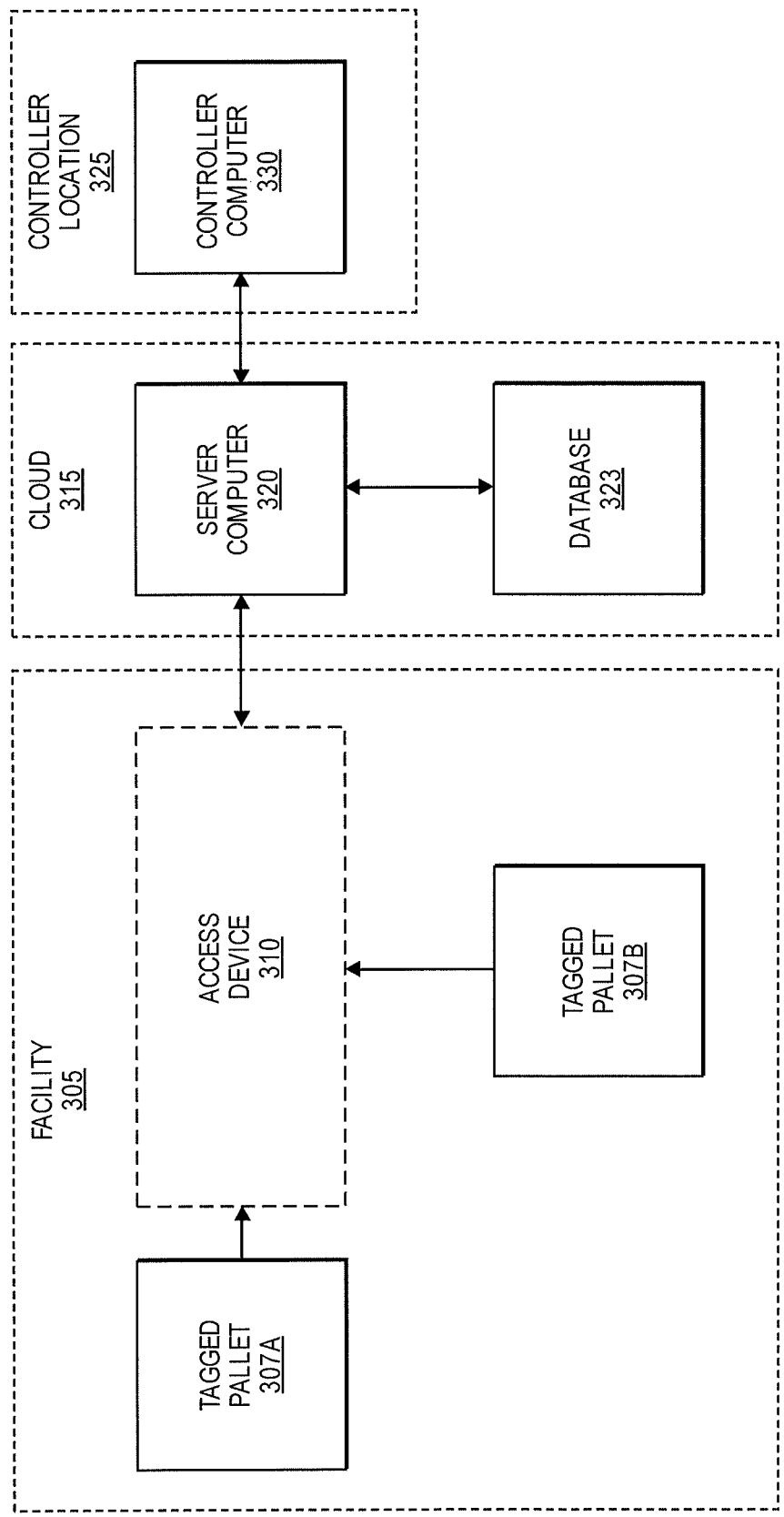
FIG. 3 is a block diagram illustrating a system for pallet tracking, in accordance with some embodiments.

FIG. 3 is a block diagram illustrating a system for pallet tracking, in accordance with some embodiments. The system may include tagged pallets 307A-B, an access device 310, a server computer 320, a database 323, and a controller computer 330. The tagged pallets 307A-B and the access device 310 may be located at a facility 305 in the supply chain, such as a warehouse or store. The server computer 320 and the database 323 may be located in the cloud 315, such as at one or more offsite or third party locations with online or networked storage. The controller computer 330 may be located at a controller location 325, such as at a pallet logistics and tracking company. Although shown and described with respect to a certain number of entities performing certain functions, it is contemplated that a greater or fewer number of entities may perform the functions described herein. For example, the functions of the server computer 320 may be spread across multiple server computers. In another example, the database 325 may be incorporated internally to the server computer 320.

In some embodiments, the tagged pallets 307A-B may communicate data to the access device 310 via a beacon or other communication medium. The tagged pallets 307A-B may be capable of communicating using certain communication protocols (e.g., short range, long range, or lower power communication protocols, such as Bluetooth LE, WiFi, cellular communication, GSM, satellite, etc.). The data may cause the access device 310 to perform one or more operations. For example, the access device 310 may aggregate the data received from the tagged pallets 307A-B over a period of time, and transmit the aggregated data to a server computer 320. In some embodiments, the access device 310 may only communicate with the pallets 307A-B if the pallets 307A-B are recognized or registered pallets. In another example, the tagged pallets 307A-B may transmit the data directly to the server computer 320.

Although shown and described as being in communication with two tagged pallets 307A-B, it is contemplated that the access device 310 may be in communication with any number of tagged pallets. For example, the ratio of access devices to tagged pallets may be many to one, such as ten to one. In some embodiments, the number of tagged pallets with which the access device 310 is in communication may depend upon the number of tagged pallets within communication range of the access device 310. For example, one access device 310 at a facility may be in communication with five tagged pallets, while another access device 310 at the facility may be in communication with twenty tagged pallets.

The access device 310 may be any suitable electronic user device. The access device 310 may include a communication device. A communication device may provide remote communication capabilities to a network. Examples of remote communication capabilities include using a mobile phone (wireless) network, wireless data network (e.g., 3G, 4G or similar networks), WiFi, Wi-Max, or any other communication medium that may provide access to a network such as the Internet or a private network. Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 310 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 310 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like.

The access device 310 may be in communication with the server computer 320. The access device 310 may forward aggregated tracking data collected by the tagged pallets 307A-B to the server computer 320. The server computer 320 may store the tracking data in a database 323. For example, each piece of tracking data may be received with an associated pallet identifier. Each pallet identifier may have an entry in the database 323 with which the associated tracking data may be stored.

In other words, the server computer 320 may store the tracking data in association with the identifier of the tagged pallet 307A-B in the database 323. For example, the server computer 320 may retrieve the entry in the database 323 associated with the pallet identifier and write the tracking data in the record. In some embodiments, the tracking data may be written to the record along with a timestamp indicating the date and time that the tagged pallet 307A-B transmitted the tracking data. Thus, the record corresponding to a particular pallet may include a plurality of tracking data collected at a plurality of times. In some embodiments, some or all of the functions of the server computer 320 may alternatively or additionally be performed by another entity or system, such as the access device 310.

In some embodiments, the server computer 320 may provide these records from the database 323 to a controller computer 330. The controller computer 330 may be an entity that tracks, maintains, and/or owns the tagged pallets 307A-B. The controller computer 330 may use this tracking data to perform analytics. For example, the controller computer 330 may determine whether the tagged pallets 307A-B are at the correct facility 305, to determine where the tagged pallets 307A-B are in the supply chain, to determine the cycle time of the tagged pallets 307A-B, to predict timing of the tagged pallets 307A-B at a particular location, to compute supply chain visibility metrics, etc. In some embodiments, supply chain visibility metrics may include inventory at a given facility or in a given region, dwell time, and velocity metrics between regions or between facilities in the supply chain.

Figure 4:
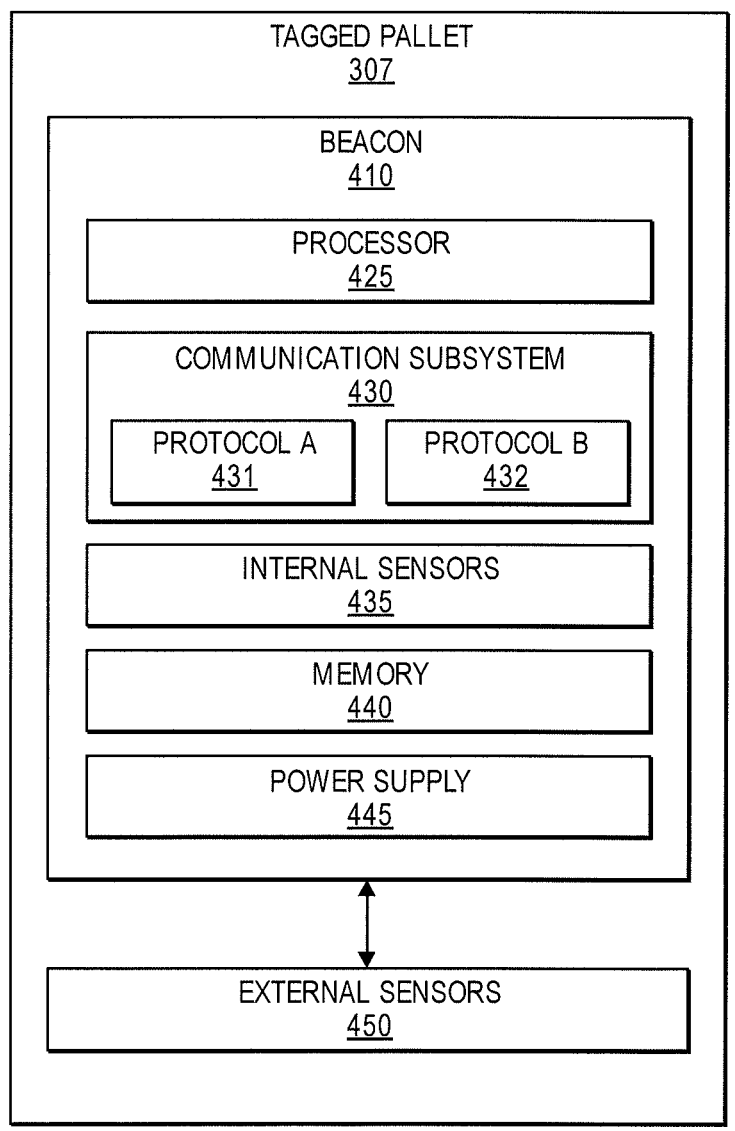
FIG. 4 is a block diagram illustrating a tagged pallet, in accordance with some embodiments.

The tagged pallets 307A-B may include components for performing multiple functions, as described herein. FIG. 4 is a block diagram illustrating the system components of a tagged pallet 307. In some embodiments, tagged pallet 307 may be implemented as pallet 100, pallet 200, tagged pallet 307A and/or tagged pallet 307B. The tagged pallet 307 may include a beacon 410 in operative communication with one or more external sensors 450. The beacon 410 may be implemented as the beacon 150, in some embodiments. The beacon 410 may include device hardware coupled to a memory 440. The device hardware may include a processor 425, a communication subsystem 430, internal sensors 435, and a power supply 445. In some embodiments, the beacon 410 may be implemented as an active tag e.g., an RFID tag). The beacon 410 may be associated with an identifier (e.g., an active tag identifier).

The processor 425 may be implemented as one or more integrated circuits (e.g., one or more single core or multicore microprocessors and/or microcontrollers), and may be used to control the operation of the beacon 410. The processor 425 can execute a variety of programs in response to program code or computer-readable code stored in memory 440, and can maintain multiple concurrently executing programs or processes. The communication subsystem 430 may include one or more transceivers and/or connectors that can be used by the beacon 410 to communicate with other devices (e.g., the external sensors 450, reader pallets, beacons, access devices, etc.) and/or to connect with external networks. In some embodiments, the communication subsystem 430 may be configured to communicate using more than one protocol (e.g., protocol A 431 and protocol B 432). Protocol A 431 and protocol B 432 may be two different wired or wireless communication protocols. For example, protocol A 431 and protocol B 432 may be selected from the group including Bluetooth, Bluetooth LE, near field communication, WiFi, cellular communication, Ethernet, fiber optics, etc. In some embodiments, protocol A 431 and protocol B 432 may both be short range, lower power and/or lower cost communication protocols. In some embodiments, protocol A 431 and/or protocol B 432 may be long range, higher power and/or higher cost communications protocols. The particular protocol used for a particular communication may be determined based on any of a number of factors, including availability, signal strength, type and/or amount of power received from or remaining on power supply 445, power needed to communicate on a particular protocol, cost associated with using a particular protocol, data throughput, type of data to be communicated, size of data to be communicated, and the like.

The internal sensors 435 may include any movement-related, location-related, and/or environmental-related sensors. For example, the internal sensors 435 may include a global positioning system (GPS), an accelerometer, a gyroscope, a barometer, a thermometer, a humidity sensor, a light sensor, a microphone, combinations thereof, and/or the like. The internal sensors 435 may measure, for example, position, location, velocity, acceleration, distance, rotation, altitude, temperature, humidity, pressure, sound, light, capacitance, inductance, resistance, voltage, chemical presence, combinations thereof, and/or the like. The internal sensors 435 may be coupled to the communication subsystem 430, such that sensor measurements may be transmitted off of the tagged pallet 307 to other devices or systems, as described further herein.

The memory 440 may be implemented using any combination of any number of non-volatile memories (e.g., flash memory) and volatile memories (e.g., DRAM, SRAM), or any other non-transitory storage medium, or a combination thereof media. In some embodiments, the memory 440 may be included in the processor 425. The power supply 445 may include any wired or wireless power supply, such as a power outlet supply, a solar panel, and/or a battery.

The beacon 410 may be coupled to one or more external sensors 450 on the tagged pallet 307 in some embodiments. The external sensors 450 may include, for example, a weight sensor and/or any of the sensors described above with respect to the internal sensors 435. In one example, the weight sensor may include circuitry that measures the weight of a load on the tagged pallet 307. The weight sensor may transmit the weight to the beacon 410. The beacon 410 may use the communication subsystem 430 to transmit this data off of the tagged pallet 307 to other devices or systems, as described further herein.

Figure 5:
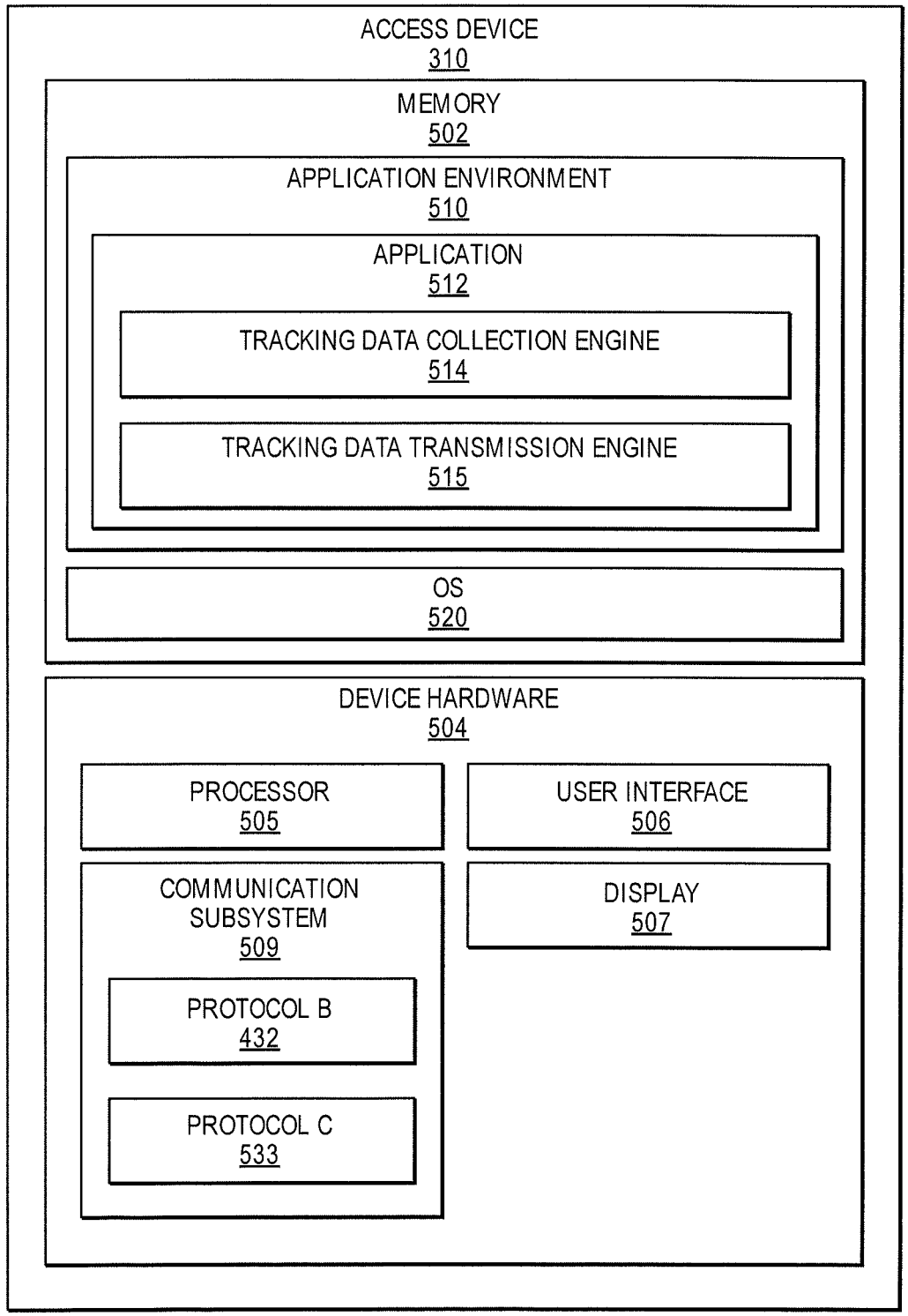
FIG. 5 is a block diagram illustrating an access device, in accordance with some embodiments.

FIG. 5 is a block diagram illustrating an access device 310, in accordance with some embodiments. The access device 310 may include device hardware 504 coupled to a memory 502. Device hardware 504 may include a processor 505, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 310. Processor 505 can execute a variety of programs in response to program code or computer-readable code stored in memory 502, and can maintain multiple concurrently executing programs or processes. User interface 506 can include any combination of input and output elements to allow a user to interact with and invoke the functionalities of the access device 310. In some embodiments, user interface 506 may include a component such as display 507 that can be used for both input and output functions. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that processes tracking data received from a tagged pallet and transmits it to a server computer via a communication protocol. In some embodiments, the communication protocol used by the access device 310 may not be available to the tagged pallet (e.g., wired Ethernet communications). Application 512 may include a tracking data collection engine 514 and a tracking data transmission engine 515. In some embodiments, one or more of these components can be provided by another application or component that is not part of application 512.

The tracking data collection engine 514 may be configured to, in conjunction with the processor 505 and the communication subsystem 509, receive tracking data associated with any number of tagged pallets. The tracking data transmission engine 515 may be configured to, in conjunction with the processor 505 and the communication subsystem 509, transmit the aggregated tracking data to a server. In some embodiments, the tracking data collection engine 514 may receive tracking data at a first frequency, and the tracking data transmission engine 515 may transmit tracking data at a second frequency. For example, the tracking data collection engine 514 may receive tracking data once every two minutes, while the tracking data transmission engine 515 may transmit tracking data once every five minutes. This may allow the access device 310 to collect and aggregate multiple sets of tracking data from multiple reader pallets before transmitting the tracking data to a server computer. In some embodiments, these functions may be alternatively or additionally implemented in an additional reader pallet, instead of in an access device 310.

Communication subsystem 509 may include one or more transceivers and/or connectors that can be used by access device 310 to communicate with other devices (e.g., the tagged pallet) and/or to connect with external networks (e.g., to connect to the server computer 320). The communication subsystem 509 may be configured to communicate according to protocol B 432 and/or protocol C 433. In some embodiments, protocol B 432 and protocol C 433 may be the same or different as protocol A 431 and protocol B 432. For example, protocol B 432 may be a shorter range communication protocol for communicating with tagged pallets, while protocol C 433 may be a longer range communication protocol for communicating with the server computer 320.

Figure 6:
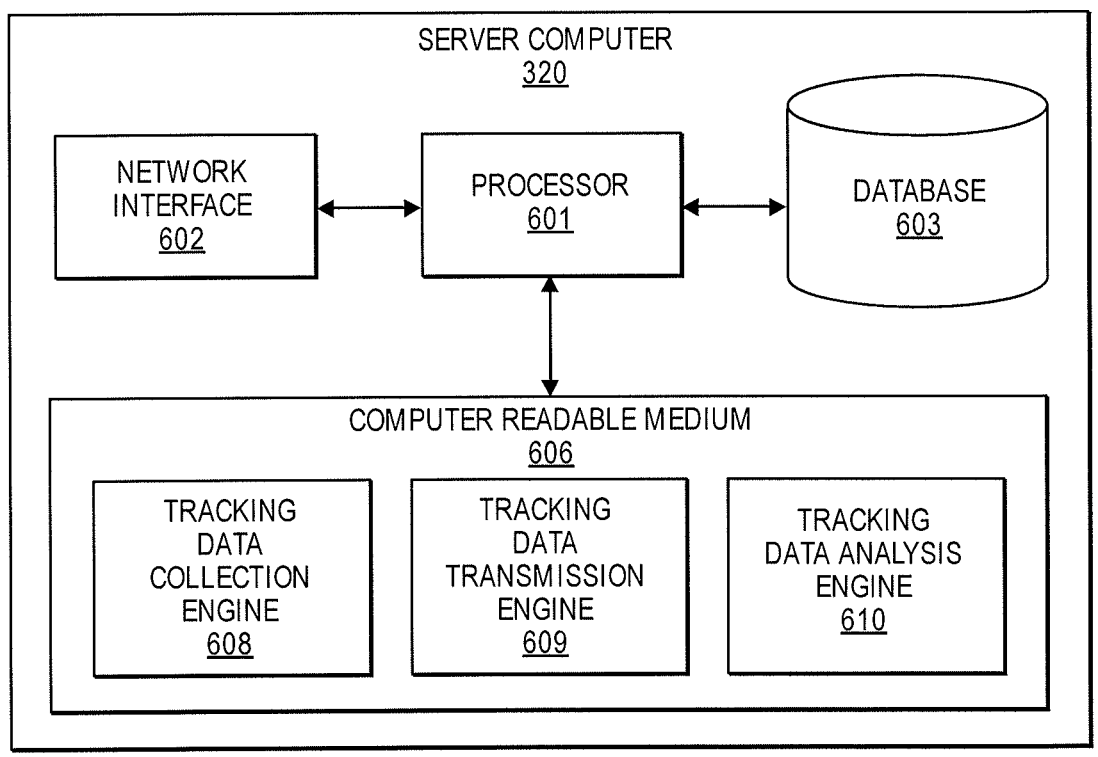
FIG. 6 is a block diagram illustrating a server computer, in accordance with some embodiments.

FIG. 6 is a block diagram illustrating a server computer 320, in accordance with some embodiments. Server computer 320 may include a processor 601 coupled to a network interface 602 and a computer readable medium 606. Server computer 320 may also include or otherwise have access to a database 603 that may be internal or external to the server computer 320.

Processor 601 may include one or more microprocessors to execute program components for performing the pallet tracking functions of the server computer 320. Network interface 602 may be configured to connect to one or more communication networks to allow the server computer 320 to communicate with other entities, such as the access device, the controller computer, tagged pallets, etc. The network interface 602 may be configured to communicate according to protocol B 432 and/or protocol C 433 in some embodiments. In some embodiments, protocol B 432 and/or protocol C 433 may be shorter range, longer range, lower power, higher power, lower cost, and/or higher cost communication protocols that may be used to communicate with tagged pallets, servers, access devices, and/or the like.

Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the pallet tracking functions of server computer 320. For example, computer readable medium 606 may include code implementing a tracking data collection engine 608, a tracking data transmission engine 609, and a tracking data analysis engine 610. In some embodiments, the tracking data analysis engine 610 may be optional and may instead be implemented by a controller computer 330.

The tracking data collection engine 608 may be configured to, in conjunction with the processor 601 and the network interface 602, receive aggregated tracking data associated with a number of tagged pallets from a plurality of access devices. The tracking data transmission engine 609 may be configured to, in conjunction with the processor 601 and the network interface 602, transmit the aggregated tracking data to a controller computer. In some embodiments, the tracking data collection engine 608 may receive tracking data at a first frequency, and the tracking data transmission engine 609 may transmit tracking data at a second frequency. For example, the tracking data collection engine 608 may receive tracking data once every five minutes, while the tracking data transmission engine 609 may transmit tracking data once every ten minutes. This may allow the server computer 320 to collect and aggregate multiple sets of tracking data from multiple reader pallets and/or access devices before transmitting the tracking data to a controller computer.

In some embodiments, the server computer 320 may include a tracking data analysis engine 610. The tracking data analysis engine 610 may be configured to, in conjunction with the processor 601, use the tracking data to perform analytics. For example, the tracking data analysis engine 610 may determine whether the tagged pallets are at the correct facility, to determine where the tagged pallets are in the supply chain, to determine the cycle time of the tagged pallets, to predict timing of the tagged pallets at a particular location, to compute supply chain visibility metrics, etc. In some embodiments, supply chain visibility metrics may include inventory at a given facility or in a given region, dwell time, and velocity metrics between regions or between facilities in the supply chain. The server computer 320 may transmit these analytics to a controller computer via the network interface 602.

Block Chain for Smart Contracts

According to some embodiments of the invention, smart contracts may be recorded to a ledger, such as a block chain. Data may be collected from pallets tagged with beacons and may be saved to the block chain. This data may be indicative of the partial or complete fulfillment of one or more conditions of smart contracts recorded to the block chain. Upon fulfillment of particular conditions as indicated by the block chain, the smart contracts may be automatically executed (e.g., payment may be initiated).

Figure 7:
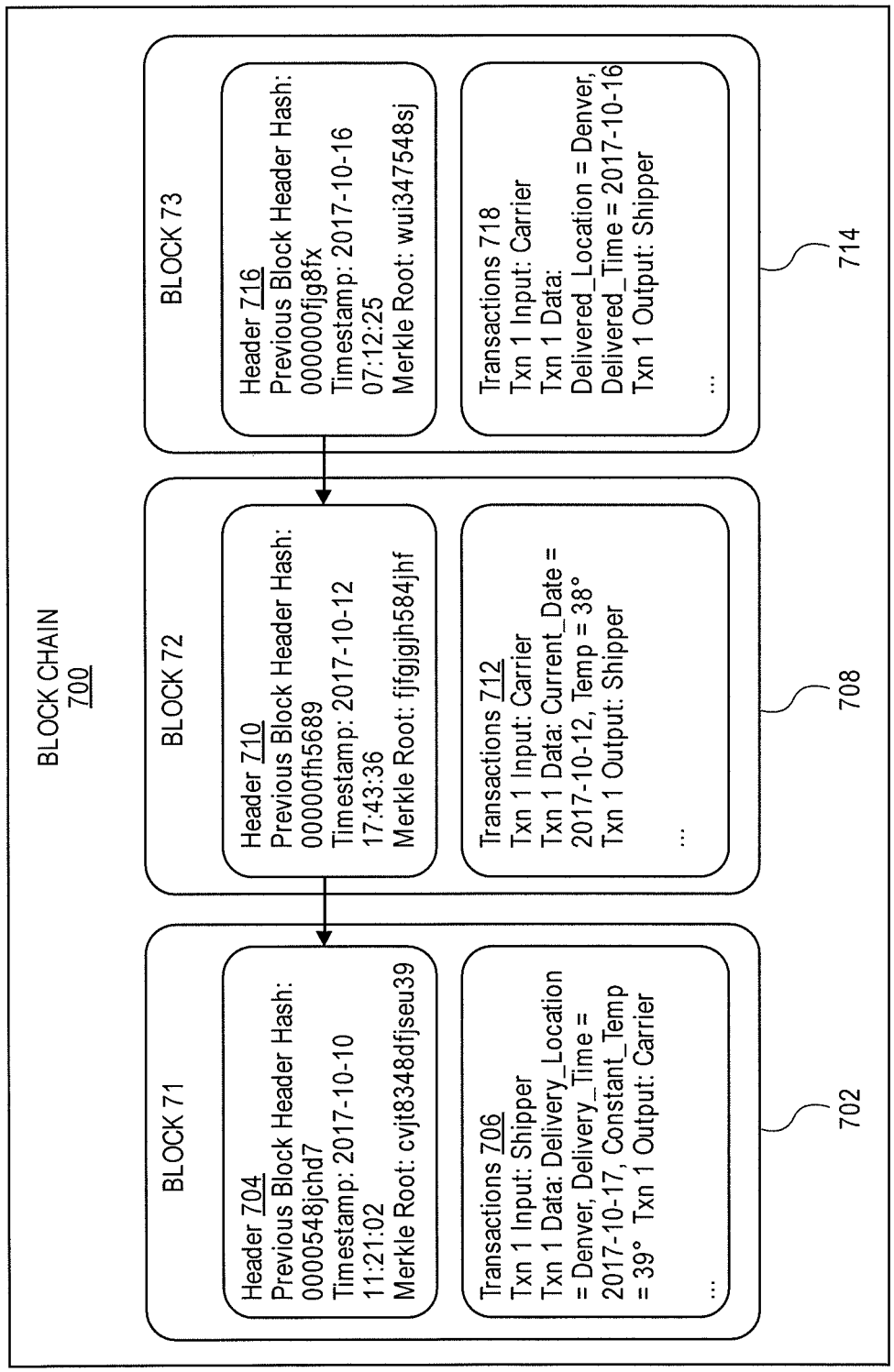
FIG. 7 is a block diagram illustrating a block chain, in accordance with some embodiments.

FIG. 7 shows a block diagram of a block chain 700 according to some embodiments of the present invention. Block chain 700 may be implemented as database 323 of FIG. 3, in some embodiments, but may be accessed by multiple parties, as described further herein. Block chain 700 illustrates three consecutive blocks in an exemplary block chain: block 702, block 708, and block 714. The block chain 700 may be a data structure that aggregates transactions for inclusion in the block chain 700. Each block may include a header and a list of transactions. For example, block 702 may include header 704 and transactions 706. Block 708 may include header 710 and transactions 712. Block 714 may include header 716 and transactions 718.

Headers 704, 710, 716 may include at least three sets of metadata: a previous block header hash, a timestamp, and a merkle root. The previous block header hash may connect each block to the previous block. For example, in header 710 of block 708, "00000fh5689" may be a hash of header 704 of block 702. In other words, a cryptographic hashing algorithm (e.g., SHA256) may be applied any number of times to the header 704 to obtain the value "00000fh5689", which may be included in the header 710 of the block 708. The timestamp may be the creation time of the block. For example, block 708 may have been created on Oct. 12, 2017 at 5:43:36 PM. The merkle root may be a hash of the root of the merkle tree of each block's transactions. A merkle tree may be a summary of all of the transactions in a block that is constructed by hashing pairs of nodes until there is only one hash. The last remaining hash is the merkle root.

Transactions 706, 712, 718 may include at least three sets of metadata per transaction: an input, transaction data, and an output. Transactions 706, 712, 718 may be data structures that encode a transfer of data from the input and the output. In some embodiments, a plurality of inputs and/or a plurality of outputs may be specified. The input may be the source of the data to be transferred (i.e., a source identifier). The transaction data may be the data to be transferred. The output may be the destination of the data to be transferred (i.e., a destination identifier). As shown in FIG. 7, there may be no cumulative data maintained by the block chain 700; instead, the available data may be scattered amongst a plurality of transactions and a plurality of blocks. For example, each piece of data associated with a single carrier may be recorded to separate blocks throughout the block chain according to when it was recorded.

For example, transactions 706 may include a single data recording transaction sourced from a shipper to a carrier. The data may include the terms of a smart contract. Transactions 712 may include a single data recording transaction sourced from a carrier to a shipper. The data may be indicative of fulfillment of one or more terms or conditions of the smart contract. The data may be collected from a tagged pallet, in some embodiments. Transactions 718 may include a single data recording transaction sourced from the carrier to the shipper. The data may be indicative of fulfillment of one or more same or different terms or conditions of the smart contract. The data may be collected from a tagged pallet, in some embodiments. Each block 702, 708, 714 may be associated with same or different parties to the smart contract. Although each block in this example shows one transaction, in other embodiments, each block can contain multiple transactions. For example, transactions 712 may include additional data to and from the same or different parties, such as weight data, location data, goods data, environmental data, payment data, and/or the like.

Implementing a block chain 700 in lieu of a traditional database in the disclosed embodiments has many advantages. In some embodiments, the block chain 700 may be multi-access in that parties across the supply chain have access to the data recorded therein. The parties may be parties to a smart contract or parties having an interest in a smart contract. This may allow for decentralized and/or shared control of the block chain. Thus, each entity may share multiple pieces of data relevant to a smart contract. This allows for transparency between entities and ecosystem simplification by adding all transactions to a single block chain. This decentralization also prevents malicious attacks as the block chain 700 does not have a central point of failure. In addition, the data written to the block chain 700 may be immutable once it is written, reducing the possibility of fraud and errors. The block chain 700 may also allow for faster transactions (e.g., by automatically recording relevant data and initiating payments for fulfilled smart contracts) and lower transaction costs (e.g., by eliminating overhead costs associated with maintaining individual systems). In some embodiments, payments between parties for smart contracts may also be recorded to the block chain 700, and/or may be implemented on a separate payment block chain. In some embodiments, the block chain 700 may instead be distributed such that separate parties may only have access to certain data recorded to the block chain 700, such as data to and/or from that party.

Methods for Executing Smart Contracts Using a Block Chain

Figure 8:
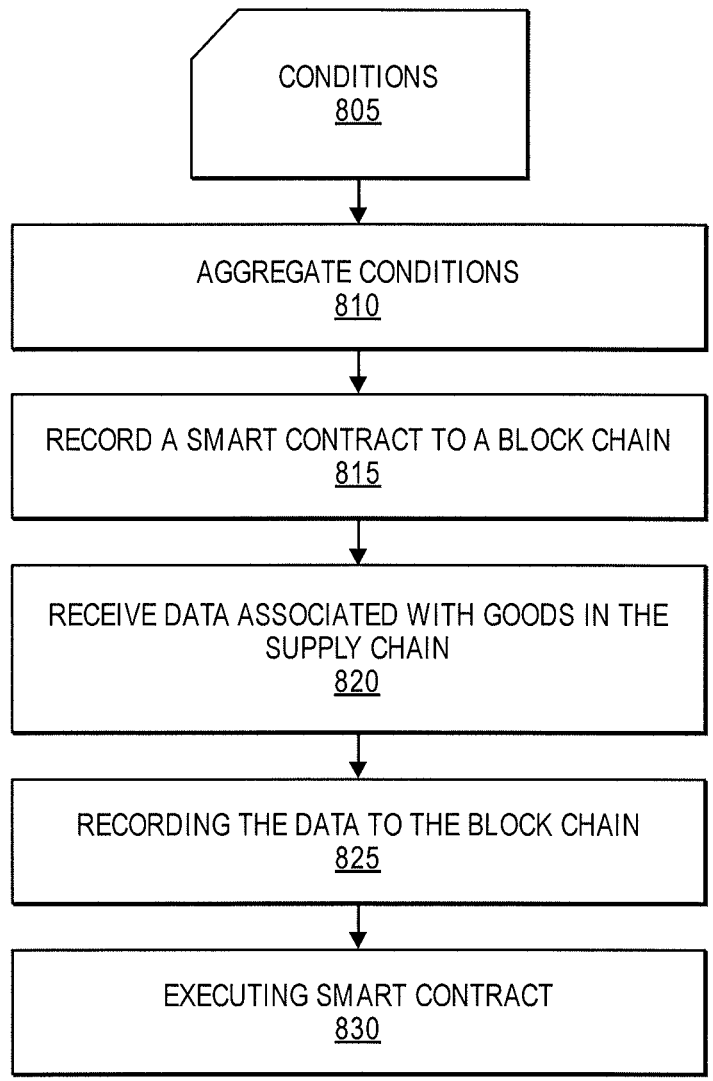
FIG. 8 is a flow diagram illustrating a method for executing smart contracts using a block chain, in accordance with some embodiments.

A variety of methods may be implemented by the above-described systems. FIG. 8 is a flow chart illustrating an exemplary method for executing smart contracts using a block chain, in accordance with some embodiments. A plurality of conditions 805 may be received. The conditions 805 may relate to goods in a supply chain. For example, conditions 805 may define terms of a contract to move goods through a supply chain. In some embodiments, conditions 805 may be received automatically from a plurality of sources across the supply chain. The sources may be parties handling and/or interested in the goods in the supply chain, such as growers, shippers, carriers, manufacturers, and/or the like.

At process block 810, the conditions 805 may be aggregated, and at process block 815, a smart contract based on the conditions 805 may be assembled and recorded to the block chain. The smart contract may be a self-executing contract. The smart contract may be for a first source of the plurality of sources to execute a first condition of the plurality of conditions and a second source of the plurality of sources to execute a second condition of the plurality of conditions. For example, the smart contract may be for a carrier to transport goods from Washington, D.C. to San Francisco, Calif. in exchange for a shipper's payment of $1,000.

At process block 820, data associated with the goods in the supply chain may be received at a communication unit, such as a beacon, affixed to a carrier of the goods. The carrier of the goods may be, for example, a pallet or any other container or platform described herein. The beacon may be any of the beacons described herein. For example, the beacon may be any device capable of wireless communication. In some embodiments, the beacon may include one or more sensors. The sensors may include any sensor capable of collecting data associated with the goods, as described further herein. However, the data associated with the goods in the supply chain may not necessarily be collected from a sensor, and may instead be received through input. For example, the data associated with the goods may include a type of goods input by a user or automatically populated at the beacon.

At process block 825, the data associated with the goods may be recorded to the block chain. The data may fulfill the first condition of the first source. Continuing the above example, the beacon may generate data indicative of the location of the goods in San Francisco, Calif., and this location may be recorded to the block chain. This data would fulfill the carrier's obligation under the smart contract to transport the goods to San Francisco, Calif. In some embodiments, the data associated with the goods may indicate that a condition may not be fulfilled. For example, data associated with the goods may indicate that delivery will not occur on time. In such embodiments, the block chain may automatically supply an alternative based on other data recorded to the block chain from other suppliers so as not to interrupt the supply chain.

At process block 830, the smart contract may be self-executed. In some embodiments, the second condition of the second source may automatically be executed. For example, payment may be automatically initiated from the shipper to the carrier in the amount of $1,000. In some embodiments, payment may also be recorded to the block chain. In some embodiments, payment may be executed through the same or a separate block chain.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A computer-implemented method comprising:
   aggregating a plurality of conditions received automatically from a plurality of sources across a supply chain, wherein the plurality of conditions relate to goods in the supply chain;
   recording a smart contract to a transaction in a ledger, wherein:
      the smart contract is a self-executing contract for at least a first source of the plurality of sources to execute a first condition of the plurality of conditions and a second source of the plurality of sources to execute a second condition of the plurality of conditions; and
      the transaction comprises:
         the first source;
         the second source; and
         requirements of the smart contract comprising the first condition to be fulfilled by the first source;
   receiving, at a communication unit affixed to a carrier of the goods, data associated with the goods in the supply chain;
   recording the data associated with the goods into one of more transactions to the ledger, wherein each of the one or more transactions comprises:

a transaction input referencing the first source;
a transaction output referencing the second source; and
transaction data comprising at least a portion of the data associated with the goods in the supply chain;
determining that a combination of the transaction data in each of the one of more transactions fulfills the requirements of the smart contract; and
automatically executing the second condition of the second source.

2. The computer-implemented method of claim 1, wherein the ledger is accessible by the plurality of sources.

3. The computer-implemented method of claim 1, wherein the ledger is distributed.

4. The computer-implemented method of claim 1, wherein the carrier of the goods includes a pallet comprising:
a plurality of legs sized and positioned to allow a forklift to engage and lift the pallet between the legs; and
a base comprising a plurality of members that are orthogonal to the plurality of legs and supported by the plurality of legs to support the goods.

5. The computer-implemented method of claim 1, wherein the data associated with the goods in the supply chain is received from at least one sensor associated with the communication unit.

6. The computer-implemented method of claim 1, wherein the plurality of sources are associated with different parties in the supply chain.

7. A non-transitory computer-readable medium comprising instructions that, when executed by one or more processors, cause the one or more processors to perform operations comprising:
aggregating a plurality of conditions received automatically from a plurality of sources across a supply chain, wherein the plurality of conditions relate to goods in the supply chain;
recording a smart contract to a transaction in a ledger, wherein:
the smart contract is a self-executing contract for at least a first source of the plurality of sources to execute a first condition of the plurality of conditions and a second source of the plurality of sources to execute a second condition of the plurality of conditions; and
the transaction comprises:
the first source;
the second source; and
requirements of the smart contract comprising the first condition to be fulfilled by the first source;
receiving, at a communication unit affixed to a carrier of the goods, data associated with the goods in the supply chain;
recording the data associated with the goods into one of more transactions to the ledger, wherein each of the one or more transactions comprises:
a transaction input referencing the first source;
a transaction output referencing the second source; and
transaction data comprising at least a portion of the data associated with the goods in the supply chain;
determining that a combination of the transaction data in each of the one of more transactions fulfills the requirements of the smart contract; and
automatically executing the second condition of the second source.

8. A device system comprising:
one or more processors; and
one or more memory devices comprising instructions that, when executed by the one or more processors, cause the system to perform operations comprising:
aggregating a plurality of conditions received automatically from a plurality of sources across a supply chain, wherein the plurality of conditions relate to goods in the supply chain;
recording a smart contract to a transaction in a ledger, wherein:
the smart contract is a self-executing contract for at least a first source of the plurality of sources to execute a first condition of the plurality of conditions and a second source of the plurality of sources to execute a second condition of the plurality of conditions; and
the transaction comprises:
the first source;
the second source; and
requirements of the smart contract comprising the first condition to be fulfilled by the first source;
receiving, at a communication unit affixed to a carrier of the goods, data associated with the goods in the supply chain;
recording the data associated with the goods into one of more transactions to the ledger, wherein each of the one or more transactions comprises:
a transaction input referencing the first source;
a transaction output referencing the second source; and
transaction data comprising at least a portion of the data associated with the goods in the supply chain;
determining that a combination of the transaction data in each of the one of more transactions fulfills the requirements of the smart contract; and
automatically executing the second condition of the second source.

9. The computer-implemented method of claim 1, further comprising retrieving the combination of the transaction data from the ledger to compute velocity metrics between nodes in a supply chain.

10. The computer-implemented method of claim 1, further comprising retrieving the combination of the transaction data from the ledger to compute inventory at a node in a supply chain.

11. The computer-implemented method of claim 1, further comprising retrieving the combination of the transaction data from the ledger to compute dwell time at a node in a supply chain.

12. The computer-implemented method of claim 1, wherein the communication unit affixed to the carrier of the goods transmits the data associated with the goods in the supply chain to an access device using a first communication protocol, and the access device transmits the data to a server computer using a second communication protocol, wherein the second communication protocol has a greater range than the first communication protocol.

13. The computer-implemented method of claim 1, wherein the ledger comprises a plurality of blocks, and each of the plurality of blocks comprises:
one or more transactions; and
a header comprising:
a hash of a header of a previous block in the ledger;
a timestamp; and
a merkle root.

14. The computer-implemented method of claim 13, wherein the one or more transactions are distributed among the plurality of blocks such that the data associated with the goods is distributed amongst a plurality of blocks in the ledger rather than being represented by a single transaction.

15. The computer-implemented method of claim 1, wherein the transaction input in each of the one or more transactions represents the first source possessing the goods.

16. The computer-implemented method of claim 1, wherein the data associated with the goods comprises weight data, location data, environmental data, and payment data.

17. The computer-implemented method of claim 1, further comprising recording the execution of the second condition of the second source as a transaction in the ledger.

18. The computer-implemented method of claim 1, further comprising recording the execution of the second condition of the second source as a transaction in a separate ledger.

19. The computer-implemented method of claim 1, wherein:
- the smart contract is also a self-executing contract for a third source of the plurality of sources to execute a third condition of the plurality of conditions;
- the transaction further comprises the third source;
- the requirements for the smart contract further comprise the third condition to be fulfilled by the third source;
- the one or more transactions further comprises a transaction referencing the third source and the second source; and
- determining that the combination of the transaction data in each of the one or more transaction fulfills the requirements of the smart contract comprises determining whether the first condition and the third condition are fulfilled.

20. The computer-implemented method of claim 1, wherein:
- the first source comprises a carrier;
- the first condition comprises a delivery location and environmental conditions to be maintained during transport by the carrier;
- the second source comprises a shipper;
- the second condition comprises executing a payment from the shipper to the carrier;
- the data associated with the goods comprises an indication of a current location and current environmental conditions experienced during transport by the carrier; and
- determining that the combination of the transaction data in each of the one of more transactions fulfills the requirements of the smart contract comprises determining whether the location matches the delivery location.

* * * * *